United States Patent Office 3,501,235
Patented Mar. 17, 1970

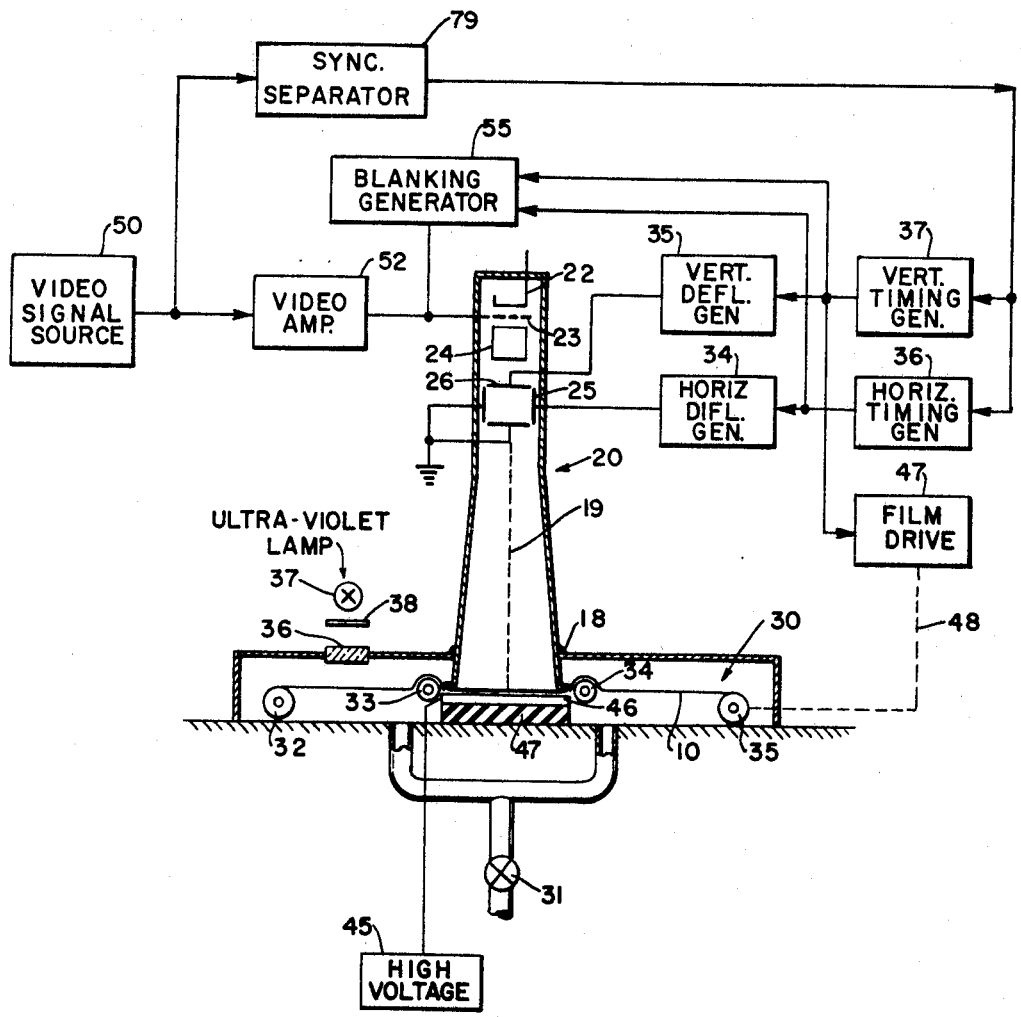

---

3,501,235
APPARATUS FOR DEVELOPING THERMOPLASTIC RESIN TYPE FILMS
Nicholas Anton, Brooklyn, and Myron Youdin, Flushing, N.Y., assignors to Eon Corporation, a corporation of New York
Filed Nov. 17, 1964, Ser. No. 411,909
Int. Cl. H01j 37/22
U.S. Cl. 355—9     10 Claims

ABSTRACT OF THE DISCLOSURE

An apparatus for developing film of the thermoplastic resin type in which the film is first pre-exposed by energy of a suitable wavelength and then subjected to the heat produced by electrons in the stream of a cathode ray tube to develop the film.

---

This invention relates to an apparatus for developing thermoplastic resin type films and more particularly to the development of these films by the heat produced by a writing element.

There are presently in existence a group of thermoplastic resin photographic materials whose operation is based upon a light scattering phenomenon rather than upon the light absorption phenomenon of conventional silver halide films. One manufacturer of such films is the Kalvar Corporation, of New Orleans, La., and films of this type are disclosed in Patents 2,911,299 to Baril, and 3,032,414 to James. All of these patents are assigned to the Kalvar Corporation.

The Kalvar type films to which this invention pertains, hereinafter called thermoplastic resin type films, comprise a thermoplastic resin material called a vehicle which is self-supporting or coated upon either a transparent or an opaque backing material to a thickness of about 0.0005 inch. Uniformly dispersed within the resin vehicle is an ultraviolet sensitive compound, such as a diazonium salt, which decomposes to form a gas upon exposure to ultraviolet radiation. Upon application of heat, the decomposition products expand to form microscopic vesicles and they are fixed. Since the vesicles have a different index of refraction than the surrounding thermoplastic resin material, light incident upon them scatters and produces the image. Thus, a two step process is used to form the image, i.e., exposure to ultraviolet radiation and development by heat.

The developed light scattering elements usually vary in diameter from about 0.5 to 2 microns. As opposed to simple bubbles that might be formed in gelatin or some other similar substance by a similar method, the developed light scattering elements or vesicles of the thermoplastic resin film are in a hydrophobic plastic and consist of cavities surrounded by a shell of more highly ordered, crystal-like material than the surrounding medium. As a result, the light scattering elements are highly resistant to environmental changes.

The opacity, or density, of the image on a thermoplastic resin film is obtained primarily by the reflection and refraction of incident light. Thus, when an image on a transparent base is viewed in reflected light the exposed and developed areas, in which there are light scattering elements, appear white and the nonlight struck or clear areas appear dark. When viewed by transmitted light the areas in which there are light scattering elements appear dark and the clear areas appear white. Thus, a positive image is produced from a negative when viewed from transmitted light.

There are several methods currently in use for producing images on thermoplastic resin type film. These methods use ultra-violet light generated by a high pressure mercury arc to expose the film. In general, only the ultraviolet light energy in the 3600 to 4000 A. is actinically efficient for exposure of thermoplastic resin type film and the exposure time is determined only by the time required to get a predetermined quantity of actinic energy on the film.

After exposure by the ultraviolet light, the film is developed by heat. Any method correctly heating the film sufficiently will produce a high quality permanent image by developing the exposed light scattering vesicles. Suitable development apparatus includes a heated roller, a platen or a liquid heat transfer medium, such as glycerin. A stream of hot air, or the conventional currents from a heated platen, in proximity to the film also may be used. The only basic requirement for heat developing film is that a sufficient quantity of heat be transferred to the exposed film. This is accomplished quite easily in the foregoing types of heat development systems.

While all of the prior art methods produce a satisfactory image on thermoplastic resin film, they suffer from several disadvantages. One of these concerns the formation of the pattern for ultraviolet light exposure of the film. This is sometimes done by making a photographic negative of the image to be recorded which is used as a mask between the ultraviolet light source and the thermoplastic resin film. Of course, the extra step of making this negative is desirably avoided.

The present invention relates to an improved method and apparatus for producing images on thermoplastic resin type film. In accordance with the invention, the entire film is first pre-exposed by light of the proper wavelength and then only selected portions of the pre-exposed film are developed by a suitable heat source in the pattern of the image to be produced. In a preferred embodiment of the invention the heat developing source is the electron beam of a cathode ray tube. One end of this tube is sealed off by a vacuum chamber through which the pre-exposed film passes. The position of the tube's electron beam and its intensity are controlled by suitable circuits, so that only predetermined areas of the film are developed by the heat of the beam. Thus, the desired image is permanently recorded on the thermoplastic resin film by the use of a selective heat development technique. In effect, the heat source "writes" the image on the film.

It is therefore an object of the present invention to provide a method and apparatus for producing images on thermoplastic resin type film.

A further object is to provide a method and apparatus for the production of images on thermoplastic resin type film in which only predetermined areas of the film are selectively developed by a heat source to produce the light scattering vesicles.

A further object is to provide a method and apparatus for producing images on thermoplastic resin type film in which the film is entirely pre-exposed by a suitable light source and selected portions of the film are developed by the heat of an electron beam of a cathode ray tube to produce the light scattering vesicles which form the image.

Other objects and advantages of the present invention will become more apparent upon reference to the following specification and annexed drawings in which:

FIGURE 1 is a schematic representation of the method and apparatus of the present invention.

In FIGURE 1, the unexposed film 10 is placed on a supply reel 32 and the film is removed therefrom by a driven takeup reel 35. The entire surface of the film 10 is first exposed by light of a suitable wavelength, such as from an ultraviolet lamp 37. Next, the exposed film is developed by the heat from a stream 19 of electrons produced by a cathode ray tube 20. Selected portions of the exposed film are developed by the heat of the electron beam by controlling its position and intensity in a pattern which will produce the desired image.

The heat development, or writing, process is carried on within a vacuum chamber 30 which seals one end of tube 20 at line 18 so that the electron stream can contact the film. The chamber 30 is evacuated by any suitable means such as the vacuum pump 31. Access is permitted into the chamber at suitable places (not shown), preferably on the side of the chamber, so that the film can be loaded into the chamber and threaded through the film drive mecanism. The usual valving for pump 31 is omitted for the sake of clarity since it is conventional and forms no part of the invention.

In the embodiment of the invention being described the entire film drive mechanism is located within chamber 30. The unexposed film is placed on a supply spool 32 located at one end of chamber 30 and then threaded over an idler pulley 33 and passed in between a conducting plate 46 and the open end of tube 20. The film then passes over another idler puller 34 to the takeup reel 35. Takeup reel 35 is driven by any suitable drive mechanism through a suitable vacuum seal. The drive mechanism can be a continuously operating motor, a stepping type drive, etc.

The chamber 30 also has a window 36 across its width formed of a suitable ultraviolet energy transparent material, for example, quartz glass, through which the light from ultraviolet lamp 37 is focused by a lens 38 onto the film. The lamp 37 is preferably operated continuously so that the light therefrom will expose all of the film as it moves within chamber 30. Suitable seals are provided around window 36 in the conventional manner.

The vacuum chamber 30 need only be evacuated by pump 31 to the order of $10^{-5}$ millimeters of mercury to obtain operation of tube 20. This degree of vacuum is readily obtainable with an air cooled diffusion pump backed by a fore pump. The vacuum system can also comprise a small fore pump backing a Vacion pump, the latter being manufactured by Varian Associates, of Palo Alto, Calif. It will only take in the order of about 1 minute to pump out chamber 30 to the desired degree of vacuum.

The cathode ray tube 20 is of generally conventional construction except that the face plate has been omitted to permit direct impingement of the electrons onto the film. As explained before, the front of the tube is sealed off by vacuum chamber 30 through which the film 10 passes. The tube has a cathode 22 which may be eiter of the directly or indirectly heated type. In a preferred embodiment of the invention a tungsten cathode is used. This type of cathode emits a somewhat lower density of electrons than the barium oxide coated cathodes normally used in cathode ray tubes. However, the latter type of electrodes are sensitive to gas contamination which causes loss of the image. Since ions may be produced which will be accelerated back to the cathode and reduce its emission it is preferred that tungsten be used as the cathode material since it is more stable and not as subject to the gas contamination problem. It is also preferred that the tungsten filament be mounted within the tube so that it can be easily replaced. A tungsten filament can also be made small enough so that the image or spot size produced by the focusing mechanism of the electron gun can also be made very small. Of course, other types of filaments of different suitable materials may be utilized.

The quantity of electrons from the cathode 22 reaching the film 10 is determined by a control grid 23. This grid receives a signal from a video signal source 50 through a video amplifier 52. The terms video is used here in its broadcast sense, and the video signal may originate from any type of suitable source, for example, a television pickup tube, flying spot scanner, photocell, over a transmission line or radio link, etc. The video signals may be of continually varying amplitude so as to encompass all shades of a color such as whites, grays and blacks or they may be of the bit type so that only blacks and whites will be reproduced. Generation of all of these types of signals and their use to control the intensity of the electron beam in a cathode ray tube is conventional in the art and no further description is needed. It should be obvious that a negative going video signal on grid 22 will reduce the number of electrons impinging upon film 10. If the negative going signal is made sufficiently large the electron stream will be prevented from impinging upon the film.

The electrons from the cathode next pass through a focusing electrode 24 which preferably is an electrostatic type lens. The lens 24 focuses the electron beam down to the desired spot size for impingement onto the film 10. Suitable lenses for accomplishing this are conventional in the art, for example electrostatic lenses used in electron microscopes. Since these lenses and power supplies are conventional in the art and therefor in themselves do not form the present invention, no further description is needed.

The focused electron beam produced by the lens 24 is directed to the proper point of impingement on the film 10 by a deflection system including horizontal and vertical deflection elements 25 and 26. One of each of the horizontal and vertical deflection elements is connected to a suitable source of reference potential, such as ground. While an electrostatic deflection system is shown, it should be obvious that an electromagnetic system could be used just as well, as is conventional in the art.

The deflection signals for the horizontal and vertical deflection elements come from a respective horizontal and vertical deflection generators 34 and 35. Both of these units produce the necessary deflection waveforms, i.e., sawtooth for an electrostatic deflection system and trapezoidal or other suitably corrected shape for an electromagnetic deflection system.

The horizontal deflection generator 34 receives timing signals from a horizontal timing generator 36, while the vertical deflection generator receives timing signals from a vertical timing generator 37. These generators are also conventional and their output is selected to produce the desired scanning rate.

The signals from the timing generators 36 and 37 may be either self-produced or produced in response to synchronization pulses from an external source. In the system shown in FIG. 1, a synchronizing separator 39 is indicated which may be utilized when the synchronizing information is transmitted by a signal source such as a television camera. The sync separator 39 produces horizontal and vertical synchronizing pulses to operate the horizontal and vertical timing generators and, in turn, the horizontal and vertical deflection generators. All of these components are well known in the television art and no further description thereof is needed.

To complete the components for the heat developing tube 20, a source 45 is provided to produce the high voltage necessary for accelerating the electrons from the cathode 22 onto the film 10. The high voltage from source 45 may be connected to any suitable point on the tube. As shown, the voltage from source 45 is applied to a conducting plate 46 within chamber 30 which is located adjacent and spaced slightly away from the end of the tube 20 and in back of the film. The plate 46 is mounted on top of an insulating member 47 located on the bottom wall of the chamber. By using this arrangement, the electrons in stream 19 are attracted directly onto the film. Also, as is conventional in high voltage systems of this type, a positive potential may be applied to a conductive coating on the inner wall of the tube to collect and remove the electrons produced by secondary emission and those that are scattered back toward the rear of the tube. It should be understood, that other types of accelerating electrode systems may be utilized as conventional in the art.

The takeup reel 35 is driven by a film drive mechanism 47. This unit has an output shaft 48 which extends into chamber 30 through a suitable vacuum seal (not shown). The film drive may operate continuously to move the film without stopping or it may be moved intermittently. If continuous movement is used, heat development can be accomplished on a line by line basis and there would be no need for vertical scanning of beam 19. In this case a fixed potential would be applied to vertical deflection element 25. If the development of the image is to be produced on a frame by frame basis, then the vertical deflection timing signals from generator 37 would operate mechanism 47. In this case it would be of the step type film advance used in motion picture equipment. A shutter may also be used for frame by frame scanning to block out the ultraviolet light from the film on the portions between frame.

A blanking generator 55 is also shown in FIGURE 1 whose output is connected to the control grid of tube 20. The generator 35 produces signals to block or substantially reduce the electron beam on horizontal and vertical retrace. The generator is triggered by the signals from timing generators 36 and 37 in a manner conventional in the art.

While a chamber 30 has been utilized in FIG. 1 which encloses the film drive and takeup mechanism, it should be understood that other suitable modifications may be used. For example, the supply reel 32, the takeup reel 35, and the portion of the film to be exposed by the ultraviolet lamp 37 may be located outside of the vacuum writing chamber. In this case, after being exposed by lamp 37, the film passes through a suitable vacuum lock into writing chamber 30. Only the idler pulleys 33 and 34 are within the chamber to hold the film in close proximity to the end of the cathode ray tube.

Before entering the writing chamber the film first passes through a system of air-locks to accomplish a pre-exhaust. Thus, the film enters the high vacuum writing chamber 30 enclosing the cathode ray tube from a region of low pressure, rather than one of atmospheric pressure, and it undergoes a reasonably thorough out-gassing before reaching the writing chamber. It is also preferred that metal bellows be provided to permit relative motion of the parts necessary to make alignment or adjustment of the film in any position of the vacuum system.

For ease of maintenance, the various sections, including the air-locks and the portions therebetween are fabricated of metal utilizing rubber-gasketed vacuum seals therebetween.

Whether a completely closed chamber, such as shown in FIG. 1, or a vacuum-lock system is used, automatic valving, preferably activated by a single crank, is also provided to isolate the vacuum pumps while the film threading is taking place. When a fore pump and a diffusion pump is used, this makes it unnecessary to allow the diffusion pump to cool before air can be admitted to the high vacuum chamber to permit threading.

In the fore pump diffusion pump system, to reach an operating vacuum the valves must first be placed in a position where the fore pump is connected to the vacuum chamber while the diffusion pump or vacuum pump is isolated. Next, the valve system is placed in a position where both the diffusion pump and the fore pump act in series. Since the diffusion pump contains no moving parts it cannot contribute to mechanical vibration of the equipment. A fore pump is a mechanical pump and therefore it must be suitably isolated to avoid vibration of the image during exposure or development of the film. Vacion pumps are preferably used because they contain no liquids and have very little vibration.

The heat development requirement for one type of thermoplastic resin type film 0.004±.0015 inch thick is 0.5 calorie/cm.² This quantity is computed for a system using a heat roller, a platen or liquid heat transfer medium, all of which developing systems require that the heat be conveyed through both the backing material, for example Mylar, and the vehicle materials, for example saran, in which the diazonium salt compound is dispersed or coated. The heat requirements vary in accordance with the overall thickness of the film and the thickness of the backing material and vehicle material.

In the developing system of the present invention, the heat requirements are not as great since the heat from the electron beam is directed only onto the vehicle material for development. For the same type of film described in the paragraph above, in which the vehicle layer is .0002 inch thick, the heat developing requirements are approximately .031 calorie/gram. A considerable amount of the reduction in the heat requirements is due to the fact that the heat need not pass through the Mylar backing, which has poor thermal conductivity.

The voltage required for the electron beam can be readily produced to obtain the necessary, and relatively low, heat requirements. In selecting the beam current and acceleration voltage, consideration is given to the increased number of electrons that will pass through the vehicle and be lost in the backing as the accelerating voltage is raised. These lost electrons do not contribute to the development of the image. Consequently, a compromise is struck, tending toward reduction of the acceleration voltage and increase of the beam current, within the limits imposed by the capacity of the cathode of the tube and obtaining the desired beam spot size.

Any deleterious electrostatic charge built up between the vesicles is discharged by secondary electrons or capacitive coupling between the film and the high voltage source. Also, the backing material can be made slightly conductive, if desired, to provide an electrostatic discharge path.

Therefore it can be seen that a novel method and apparatus have been disclosed for producing images on thermoplastic resin type film. This is accomplished, according to the present invention, by selectively developing portions of the film by a heat source to produce the desired image on the film.

While a preferred embodiment of the invention has been described above, it will be understood that it is illustrative only, and the invention is limited solely by the appended claims.

What is claimed is:

1. In combination, a film of thermoplastic resin type for producing visible images in which gas is liberated by exposing the film to light of a predetermined wavelength, a source of light energy for exposing said film, means for producing a quantity of electrons, and means for controlling the electrons to impinge upon and heat a selected exposed portion of the film to produce and fix gas vesicles in said selected exposed portion of the film to thereby develop said selected portion of the film by the heat.

2. Apparatus as set forth in claim 1 wherein said electron producing means is an electron gun.

3. Apparatus as set forth in claim 1 and further comprising means electrically coupled to said electron producing means for controlling the movement and position of the electrons.

4. Apparatus as set forth in claim 3 and further comprising means electrically coupled to said electron producing means for controlling the quantity of the electrons produced.

5. Apparatus as in claim 1 wherein said electron producing means comprises first means with an electron gun at one end thereof, said first means having an open end opposite said electron gun, means forming a vacuum chamber at the open end of said first means, and means for moving the film through said vacuum chamber for development by the electrons.

6. Apparatus as in claim 5 wherein said sources of light energy produces energy in the ultraviolet range.

7. Apparatus as set forth in claim 5 further comprising an accelerating electrode means located adjacent the side of the film opposite the open portion of the tube.

8. Apparatus as in claim 1 wherein said electron producing means comprises an electron gun and further comprising a control electrode for controlling the quantity of electrons reaching the film.

9. Apparatus for producing the images on thermoplastic resin type film in which gas in the film is liberated by exposing the film to light of a predetermined wavelength and light scattering vesicles of the exposed film are developed by heat comprising:

a source of light energy in the ultraviolet range for exposing said film, and means for producing electrons for impingement upon said film to selectively develop exposed areas of the film by the heat produced by the electrons upon interaction with the film.

10. Apparatus for producing images on thermoplastic resin type film in which gas in the film is liberated by exposing the film to light of a predetermined wavelength and light scattering vesicles of the exposed film are developed by heat comprising:

a source of light energy for exposing said film, a cathode ray tube for producing a stream of electrons, said tube having an open portion toward which said electrons are directed, a vacuum chamber surrounding the open portion of said tube, said exposed film passing through said vacuum chamber opposite said open portion whereby exposed areas of the film are developed by the heat produced by the electrons in the stream upon interaction with the film, and an electron stream accelerating electrode located adjacent the side of the film opposite the open portion of the tube.

References Cited

UNITED STATES PATENTS 3,308,444   3/1967   Ting.

JOHN M. HORAN, Primary Examiner

U.S. Cl. X.R.

340—173; 96—49